United States Patent
Stewart

(10) Patent No.: US 7,668,899 B2
(45) Date of Patent: Feb. 23, 2010

(54) DECOUPLED ROUTING NETWORK METHOD AND SYSTEM

(75) Inventor: Gilbert Mark Stewart, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 796 days.

(21) Appl. No.: 10/140,150

(22) Filed: May 7, 2002

(65) Prior Publication Data

US 2003/0212734 A1 Nov. 13, 2003

(51) Int. Cl.
*G06F 15/16* (2006.01)

(52) U.S. Cl. .................. 709/201; 709/202; 709/203

(58) Field of Classification Search .............. 709/201, 709/203, 207, 217; 370/229, 235; 718/1
See application file for complete search history.

(56) References Cited

U.S. PATENT DOCUMENTS

| | | | | |
|---|---|---|---|---|
| 4,972,415 A * | 11/1990 | Walter et al. | ................. | 714/797 |
| 4,980,857 A * | 12/1990 | Walter et al. | ................. | 714/45 |
| 5,737,498 A * | 4/1998 | Murray | ................. | 700/246 |
| 6,012,084 A * | 1/2000 | Fielding et al. | ................. | 709/205 |
| 6,182,110 B1 * | 1/2001 | Barroux | ................. | 709/201 |
| 6,202,080 B1 * | 3/2001 | Lu et al. | ................. | 718/105 |
| 6,220,768 B1 * | 4/2001 | Barroux | ................. | 709/224 |
| 6,725,455 B2 * | 4/2004 | Staiger et al. | ................. | 718/102 |
| 6,839,669 B1 * | 1/2005 | Gould et al. | ................. | 704/246 |
| 2002/0091819 A1 * | 7/2002 | Melchione et al. | ................. | 709/224 |
| 2002/0099806 A1 * | 7/2002 | Balsamo et al. | ................. | 709/223 |
| 2002/0124045 A1 * | 9/2002 | Moore et al. | ................. | 709/201 |
| 2002/0150052 A1 * | 10/2002 | Olesinski et al. | ................. | 370/252 |
| 2003/0009553 A1 * | 1/2003 | Benfield et al. | ................. | 709/224 |
| 2003/0081548 A1 * | 5/2003 | Langevin et al. | ................. | 370/230 |
| 2003/0154177 A1 * | 8/2003 | Holland et al. | ................. | 706/60 |
| 2003/0177106 A1 * | 9/2003 | Brandon et al. | ................. | 706/45 |
| 2003/0177162 A1 * | 9/2003 | Staiger et al. | ................. | 709/102 |
| 2003/0202640 A1 * | 10/2003 | Knott et al. | ................. | 379/88.01 |
| 2004/0006546 A1 * | 1/2004 | Wedlake et al. | ................. | 706/46 |
| 2004/0015907 A1 * | 1/2004 | Giel et al. | ................. | 717/141 |
| 2004/0015908 A1 * | 1/2004 | Giel et al. | ................. | 717/141 |
| 2004/0068729 A1 * | 4/2004 | Simon et al. | ................. | 718/102 |

* cited by examiner

*Primary Examiner*—William C Vaughn, Jr.
*Assistant Examiner*—Maceeh Anwari
(74) *Attorney, Agent, or Firm*—Carmen Patti Law Group, LLC

(57) ABSTRACT

A method and system in a routing network sends a request for the performance of a task from an originating node in a routing system to nodes having an interface connection with the originating node. Upon receiving a response to the request from the one or more nodes, one or more of the nodes is selected to perform the task. Any node included in the network can comprise an originating node, and the steps of sending and selecting are performed substantially automatically. A preferential order of nodes automatically and dynamically maintained in dependence on the performance of task(s) by the nodes.

32 Claims, 7 Drawing Sheets

DATABASE FOR NODE A

TABLE I

| NODE | PROPERTIES |
|------|------------|
| B | x x x |
| C | x x x |
| D | x x x |
| E | x x x |
| ... | ... |
| N | x x x |

TABLE II

| TASK# | CRITERIA |
|-------|----------|
| 1 | x x x |
| 2 | x x x |
| 3 | x x x |
| 4 | x x x |
| ... | ... |
| N | x x x |

TABLE III

| PREFERRED NODES ||
|-------|----------|
| TASK# | NODE(S) |
| 1 | PREFERRED NODES LISTED IN ORDER |
| 2 | "  "  "  "  " |
| 3 | "  "  "  "  " |
| ... | ... |
| N | "  "  "  "  " |

FIG. 2

DECOUPLED ROUTING NETWORK METHOD AND SYSTEM

BACKGROUND

Existing routing systems have databases that comprise the properties and addresses of all nodes in a routing network. Any node that functions as a gateway provides task(s) for the network and other nodes in the network. For example, a gateway node may receive a packet associated with a task and will then refer to the routing table to determine the address of the location where the packet is to be delivered.

If errors are made in manually setting up the routing table, such as under-utilizing or over-utilizing a node, the routing network will not operate efficiently until the inefficiency is discerned and a manual correction is made in the routing table.

When the status of a node changes, such as being unable to perform a task associated with a packet, any revision or correction of the status of the node in the network must be made manually identified, and the appropriate changes made in the routing table for that node.

A short coming of the manually constructed routing table is that it relies on installing the correct properties and addresses associated with the nodes in the routing network, and manually making changes in the routing table to correct any errors or to respond to changes in the topology of the network.

SUMMARY

A method and system in a routing network sends a request for the performance of a task from an originating node in a routing system to nodes having an interface connection with the originating node. Upon receiving a response to the request from the one or more nodes, one or more of the nodes is selected to perform the task. Any node included in the network can comprise an originating node, and the steps of sending and selecting are performed substantially automatically. A preferential order of nodes is automatically and dynamically maintained in dependence on the performance of task(s) by the nodes.

DESCRIPTION OF THE DRAWINGS

Features and aspects of the invention will become apparent from the description, the claims, and the accompanying drawings in which:

FIG. 2 is a functional block diagram of an example of database of a node in accordance with the invention;

DETAILED DESCRIPTION

Figure 1:
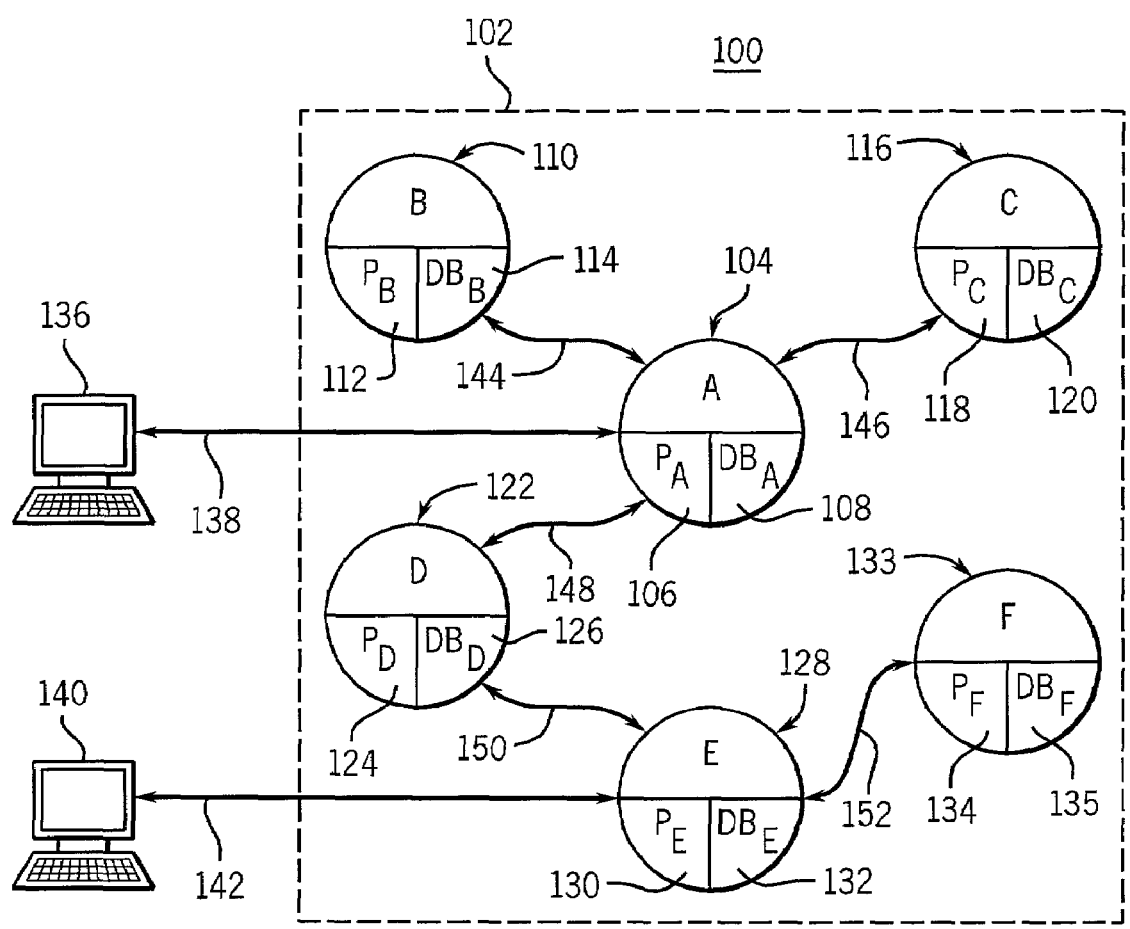
FIG. 1 is a functional block diagram representation of one example of a system that comprises a de-coupled routing network in accordance with the invention.

In FIG. 1 a system 100 shows an example of a de-coupled routing network in accordance with the invention. In this example, there exists a non-fixed relationship between resources or nodes capable of performing task(s) and requesters or nodes that request response for performing task(s) of other nodes. In an example of this invention, the nodes in a de-coupled network can automatically and dynamically react to changing resource availability, the nature and quantity of task(s), and other conditions impacting the network.

FIG. 1, shows a de-coupled routing network 102 that includes a node A 104 having a processor $P_A$ 106 and a database $DB_A$ 108, a node B 110 having a processor $P_B$ 112 and a database $DB_B$ 114, anode C 116 having a processor $P_C$ 118 and database $DB_C$ 120, node D 122 having a processor $P_D$ 124 and database $DB_D$ 126, a node E 128 having a processor $P_E$ 130 and a database $DB_E$ 132, and node F 133 having a processor $P_F$ 134 and a database $DB_F$ 135. Those skilled in the art will know how to select and match a processor with the level of complexity of any specific task(s).

As shown in FIG. 1, node A 104 is connected to computer terminal 136 by connection 138 and node E 128 is connected to computer terminal 140 by connection 142. The computer terminals 136 and 140 are sources for sending task(s) to the network 102. Terminal 136 sends task(s) to node A 104, and the computer terminal 140 sends task(s) to node E 128. Alternatively, a source for node A 104 and node E 128 can be another external terminal (not shown) such as another network or even a scheduler or other input device integrated into the node.

Referring to FIG. 1, node A 104 has an interface connection 144 with node B 110, an interface connection 146 with node C 116, and an interface connection 148 with node D 122. Node D 122 also has an interface connection 150 with node E 128, and Node E 128 has a connection 152 with node F 133.

The interface connections shown in FIG. 1 are examples. Alternate interface connections may be made among the nodes. Furthermore, additional nodes may be added or subtracted from time to time. The nodes in the network 102 may also have interface connections to nodes in other networks (not shown).

Referring to FIG. 2, an example of a functional block diagram 160 is shown for database $DB_A$ 108 for node A 104. While only the database for node A 104 is shown, the other nodes of the network also have a database as previously described.

The database 160 includes Table I which is a listing of the other nodes, B,C,D,E, . . . N, for which node A 104 has an interface or for about which node A 104 has received information. Associated with each node in Table I are the properties or other information associated with the listed node. The properties of each node may vary significantly and may from merely identifying its presence in network 102 to providing a description of complex functions that may be used by the node in performing task(s). Node A 104 selects nodes from the listing the nodes in Table I to perform task(s) that node A receives from a source such as terminal 136.

Table II shows a listing of task(s) and a description of the criteria required for the performance of the task(s). The criteria for each task is established by the source of the task, which in the example for node A 104 is terminal 136.

Table III identifies the preferred nodes listed in preferential order for performing each of the enumerated task(s) shown as 1, 2, 3, . . . N. Thus, Table III shows a correlation of the criteria for a task and the properties of the nodes listed in preferential order. Node A 104 determines which nodes are best able to perform the specific task(s). For example, Node A 104 may determine that no, only one, or a plurality of nodes qualify for forming a specific task. When more that one node qualifies for performing a task, node A 104 determines the preferential order of the nodes for the specific task, and the preferred order of the nodes is identified in Table III.

The properties of one or more of the nodes may change from time to time which may impact the ability of a node having a change in properties to perform a task. When the change in properties of any node is communicated to node A 104, then in one example node, the Tables I and III are automatically and dynamically modified to reflect the change in properties of such node. Thus, some nodes may be deleted from Table III or be reassigned to a different preferential order in Table III.

Figure 3A:
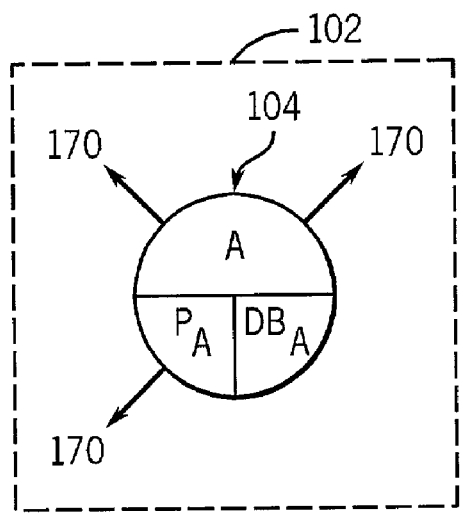
FIGS. 3a and 3b are functional block diagrams of the implementation of a node of the system shown in FIG. 1.

In FIG. 3a, the initialization and implementation of node A 104 in the de-coupled routing network 102 is shown. While node A 104 is shown in this example as an initial node installed in the network 102, any order of nodes entering the network can occur. After node A 104 is installed, it sends out a broadcast message from output leads 170 to all of its interface connections. In the broadcast message node, A 104 may disclose its own properties for performing task(s) for other nodes.

A node receiving the broadcast message from node A 104 may place information disclosed about node A 104 in a table in its database that lists the property of nodes similar to Table I for node A104. To the extent that node A 104 discloses properties for performing task(s), the node receiving the broadcast message from node A 104 may store the information about the properties of node A 104 and send a request to node A 104 to perform a task in the future in view of the properties possessed by node A 104 to perform a given task.

Figure 3B:
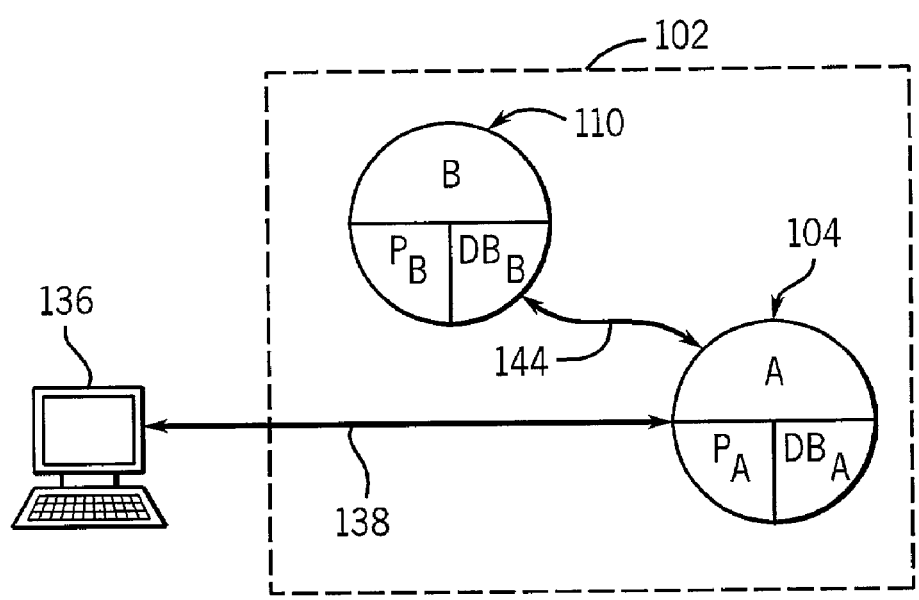

In FIG. 3b, node B 110 is shown installed in the network 102. A broadcast message is always interpreted as a request to perform a task and to respond to the originating node. When node B 110 receives the broadcast message from node A 104, node B 110 may ignore the request or provide a response indicating that node B 110 is present. Node B 110 may also provide information about the properties its possesses for performing task(s). The properties are substantially unlimited in scope and may include the ability to perform task(s), such as specific calculations or the forwarding of data packets. In one example, where node A 104 does not have a task, it will place the identity of node B 110 and its associated properties in Table I of the database 160 for node A 104 along with similar information for other available nodes. Node A 104 may refer to this information in sending out a request to nodes to perform task(s) in the future. Similarly, node B 110 and other nodes in the network may receive information from other interfaced connected nodes and construct a database as previously described including information and properties provided in the broadcast message from node A 104.

When node A 104 receives a task from the terminal 136 or other source, a network is then established and node A 104 is a "gateway" because it has a task, and node B 110 is a "server" because it can service requests made by node A 104. As described above, node A 104 is aware of node B 110 because the properties of node B 110 are listed in Table I in the database 160 for node A 104. Node B 110 could function similarly if node B 110 receives a task and node A 104 is in a database for node B 110, and node A 104 possesses the properties required to perform a task for node B 110. Thus, every node behaves similarly based on any particular event, such as being added to a network, receiving task(s), or forwarding task(s) to other nodes to be serviced.

In an example of the invention, additional nodes or competition for node B 110 may be added to the network. Then, node A 104 could establish a list of preferred nodes and list the nodes in a preferential order for a specific task as illustrated in Table III of the database 160 for node A 104. The preferential order of the nodes for a specified task in Table III is established solely within the discretion of the gateway node, represented in this example by node A 104.

The standard for establishing the preferential priority for nodes in Table III set by node A104 may be anything such as the expected speed of performance, distance of a node from A 104, or quality of performance for previous task(s).

Node A 104 could change its standard for preferential priority by reviewing the performance of the nodes and refreshing Table III of database 160. Node A 104 could determine which nodes have improved, which are no longer available in the network, and which have degraded performance, etc. Standards for performance for nodes can be raised and undependable nodes removed from Table 111. Or in another example, the rating of under performing nodes can be lowered and assigned a less preferential position in Table III of the database 160. In an example of the network, the preferential order of the preferred nodes can be established automatically and dynamically by node A 104. Thus, the network 102 containing node A 104 improves its performance of task(s) as the network 102 grows and evolves as demands on the network 102 change.

In the FIGS. 4a through 4f, the nodes A 104, B 110, C 116, D 122, and E 133 of the network 102 are described in examples of the invention to illustrate the automatic and dynamic operation of the system shown in FIG. 1. The connections 144, 146, 148 and 150 between the nodes represent the actual physical connections in the topology of the network 102 more completely shown in FIG. 1.

Figure 4A:
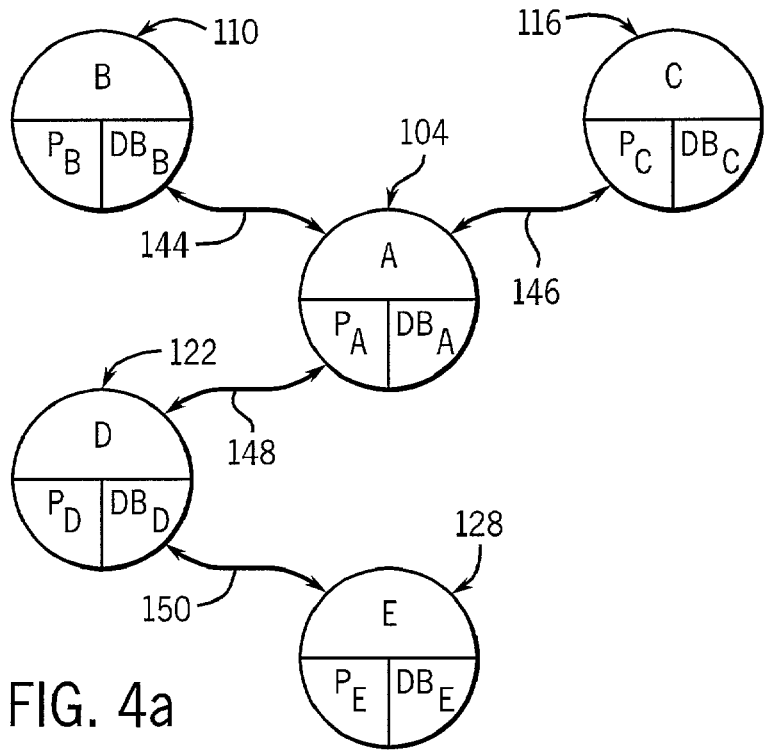
FIGS. 4a through 4f are examples of the implementations of the automatic and dynamic operation of the nodes of the system in accordance with the invention.

In FIG. 4a, for purposes of an example it is assumed that node A 104 is the first node in the network to receive a service request from a source. Thus, node A 104 acts in this particular set of sequences, as a gateway node. Any node that receives a service request from outside the network of interest (any set of nodes comprising a network or subnetwork being observed) can act as a gateway at any time. Requests may be received from outside the network of interest from another network, a node not being observed, a human operator, a scheduled program trigger, etc. The original source of the request outside this network is irrelevant in these scenarios.

The function of node A 104 may change automatically or dynamically, and since the term gateway usually refers to a static application of a node, node A 104 shall be referred to as the requesting or originating node in a particular exchange. The exchange will be comprised of having a task, sending that task to another node, and receiving a response to that task.

Referring again to FIG. 2, the database 160 for node A 104 shows the existing data representing the logical topology of the network 102. The data of the database 160, and in particular Table III, acts as a routing table. After being installed in the network of FIG. 4a, but before receiving a request to service a task, the Tables I, II and III database 160 for node A 104 are empty.

Initially after being installed in the network 102, the only data the originating node A 104 possesses regarding the topology of the network 102 or the existence of any other nodes is the data indicating the existence of the newly-installed physical connections, which are the set of entities that can be used to send and receive data potentially to other nodes in the network at this point unknown to node A 104. These physical connections are known only to the hardware, and are not included in the routing table data in Table III, but are simply default communication facilities, such as the intermediate connection 144 between Node A 104 and Node B 110.

When the Tables I, II and III of the database 160 are empty, node A 104 can send a message over the connection 144, but node A 104 does not have information about properties or capabilities of node B 110. Node A 104 can only send the broadcast message over any available interface without specifying which node(s) will receive the message. The ranges of these connections are also defined at the outset. For example, in FIG. 1, assume that node A 104 only is aware of nodes within one hop, a hop being a single connection or an interface connection between two nodes. That is to say, node A 104 is aware of node B 110, node C 116, node D122, but node A104 is not aware of node E 128.

Figure 4B:
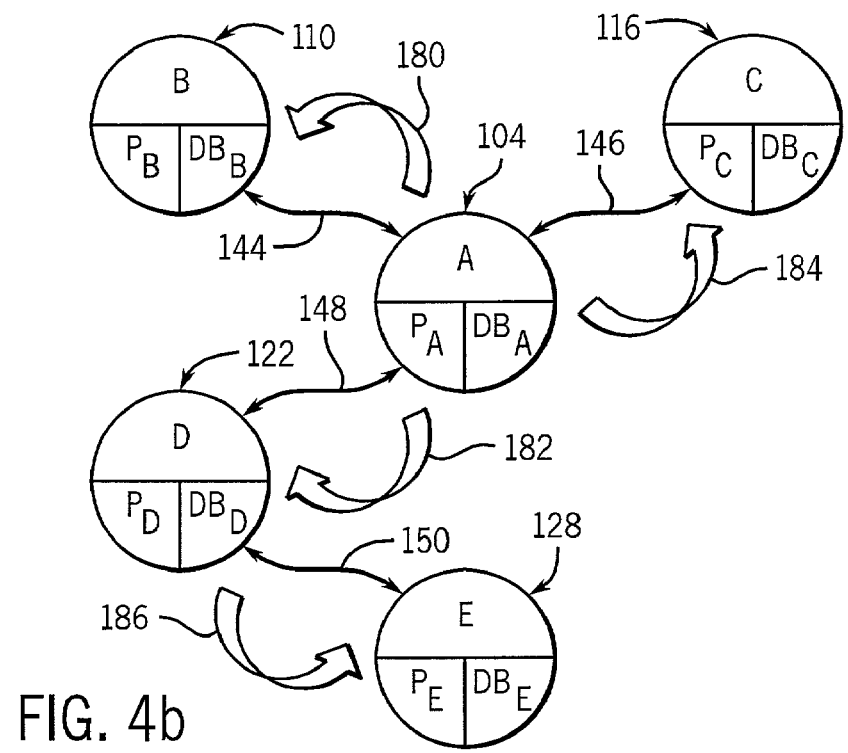

In the initial state as described for FIG. 4a, Node A 104 is only aware of the set of interface connections it has directly to the other nodes. Further, node A 104 only knows what is in the database 160 associated with node A 104. As shown in FIG. 4b, node A 104 can sit idle until a task that needs to be serviced is received at node A 104. When node A 104 receives a task, node A 104 then responds by sending out broadcast requests for any task(s) needed. Initially, addresses are not specified. Rather, messages are sent with no specified addresses to all nodes with which it has an interface connection. In FIG. 4b the broadcast request is sent to node B 110, node C 116, node D 122, and the broadcast message to the nodes having an interface connection to node A 104 is represented by the arrows 180, 182 and 184.

Since node A 104 does not have a connection to node E, when node D 122 receives a request from node A 104, node D 122 may choose to forward the request along to node E 128 as represented by arrow 150 or service the request itself, and respond to node A 104 without notifying node E 128. Alternatively, node D 122 may respond to node A 104 and forward the request to node E 128 as well. The performance of any task by a node, including the task of forwarding another task, includes as requirements for performance of that task is to also return results back to the requesting node. In this example, all nodes perform similar functions given the same situation, the task received by node E 128 from node D 122 is to "perform a task by any available means," which, in this example, involves node D 122 recruiting node E 128 to complete the task. Results are then send to the original requestor, node A 104. If, for example, node E 128 failed, and node D122 had no other candidates to perform the task, node D 122 would return a failure response to node A 104. Node A104 does not require to know why the task failed, only that node D 122 returned a failure. In other words, in decoupled routing, the "implementation" of how a task is actually performed inside the next node (even if that "node" is actually another network of nodes) is completely irrelevant to the requesting node.

Figure 4C:
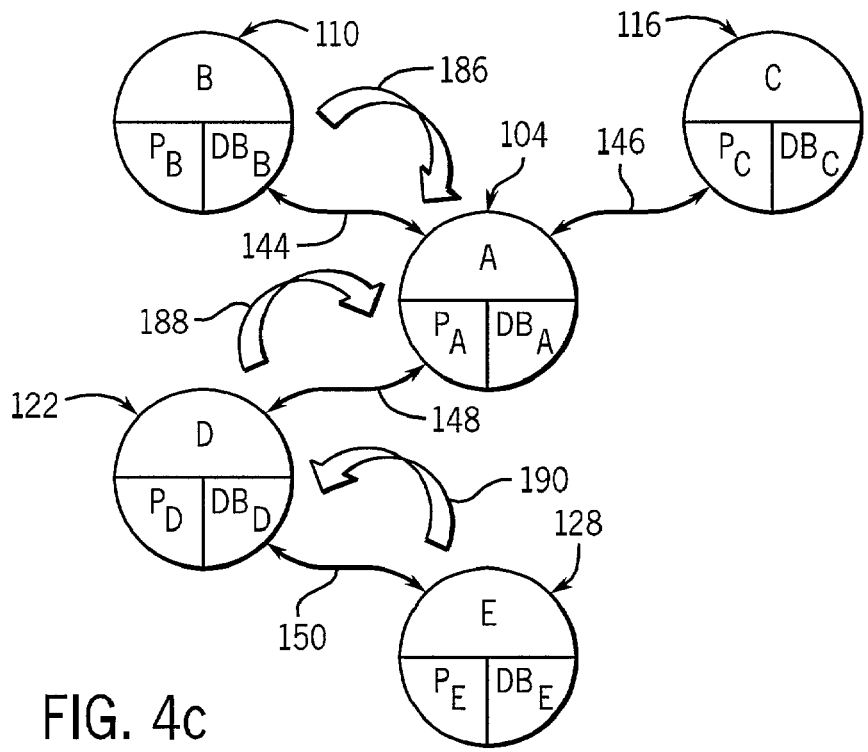

In FIG. 4c, the nodes that received the request from node A 104, as shown in FIG. 4b, evaluate the request and determine how to respond to the request. A response, for example, may comprise ignoring the request or offering to perform the task(s) associated with the request. Just as the requesting node is the sole arbiter of the success or failure or even the relative quality of the response to the task, the node that performs the task is the sole arbiter of how the task will be performed and, therefore, what is an appropriate response, including "no response." The success of an exchange, therefore, is contingent upon there being an established commonality between a requesting node and a server node so that the server node that ends up on the requesting node's database as a "preferred supplier" or preferred node for specific task(s), will always be a node which has the resources necessary (which implies "understanding" of the task) to perform the task. This understanding is part of the description of the task.

Node A 104 response with an acceptance to a response from a node that offers to perform a task(s). The acceptance is analogous to a contract between node A 104 and the responding node with the responding node presenting a winning bid.

In the example of FIG. 4c, node A 104 is shown only receiving responses, as indicated by arrows 186, 188 and 190 to nodes B 110, nodes D 122 and node E 190. The response from node E 128 is the result of node D 122 forwarding the request from node A 104 to node E 128 and then node D 122 forwarding the response of node E 128 to node A104. Node D 122 could also have sent a response to node A 104 as well. In this example, node C 116 did not respond to the request.

Figure 4D:
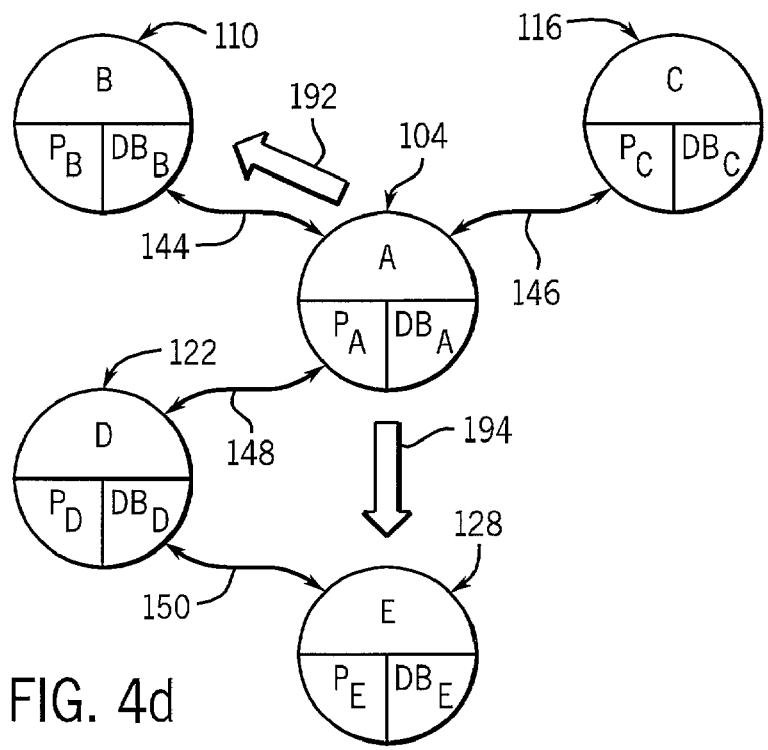

In FIG. 4d, note that only node A 104 determines which responses to its request are accepted and thus determines which node(s) made what is analogous to a winning bid. That is, node A 104 grants a servicing node an acceptance or what is analogous to a "contract" based on a standard determined solely by node A 104, and based on the criteria of the task established by the source 136. For example, if only response time is critical, it may very well be that the physical topology of the network always puts node E 128 at a disadvantage to node D 122, since node D 122 is closer to node A 104. Of course, other properties of a node may involve the extent of services that node E 128 can provide, compared to those that node D 122 can provide. Or, for that matter, the fact that node D 122 may have more work to do to accumulate the resources in order to "bid" on a contract with node a 104, and in the meantime, may be requested to forward a bid from node e 128 along to node a 104.

An unacceptable response is that essentially a "no bid". Each node acting as a server administers its own resources and knows when not to offer to perform a task. This essentially acts as a self-throttling mechanism in that a node incapable of performing a task will not offer to do so—i.e., will not "bid". In another example, a request for a response for a task may also be a request for a response that gives an estimate of how good the final or ultimate response for a task in the future is likely to be. This is applicable to complex task(s) comprised of many exchanges.

In any case, once node A 104 has defined the standard for performing the task(s) based on the criteria established by the source 136, and has determined which of the available nodes is or are likely to provide the best service for future requests, node A will enter the data for designating those nodes into its data table, as in Table III in FIG. 2. This data will then provide an optimal, logical description of the topology of the network. This data can be considered a "routing table" of Table III in the database 160 of FIG. 2. Thus, a preferential order of nodes dynamically generated by the network 102 will be established for each task.

In FIG. 4d, by node A 104 accepting responses or bids from node E 128, node A 104 can subsequently depend on node E 128 for future services. Node E 128 now appears in the routing table in Table III of FIG. 2 for Node A 104, along with node B 110. The relative preferential status of nodes B 110 and E 128 will depend on the quality or character, as determined by node A 104, of the response to the request and the ultimate performance of each node in completing the task. The relationship of node A 104 to its "preferred suppliers or nodes" is signified by the straight arrows 192 and 194, pointing from node A 104 to node B 110 and node E 128 in FIG. 4d indicating that these nodes made responses or bids that were accepted by node A 104.

Figure 4E:
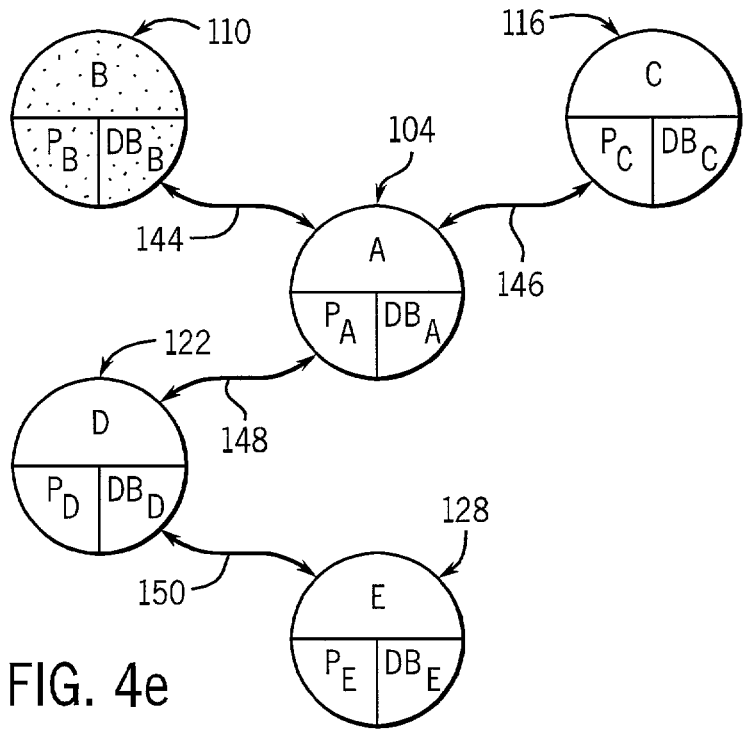

In FIG. 4e, a purpose of the dynamic routing data generation for network 102 is to optimize network performance. Obviously, all nodes requesting service could also send out broadcast messages to all other nodes. This defeats the purpose of a routing table such as the one shown in FIG. 2, and could rapidly result in a situation where the entire network bandwidth was consumed with request messages and bids, and less bandwidth would be utilized in the actual acceptance of responses, and less work would be accomplished by the network 102. Thus, the creation and organization of preferred nodes gradually taking on more responsibility for transmitting data and for servicing requests is analogous to the learning of a neural network. The network is able to perform task(s) faster and better and analogous to a natural selection and the resultant allocation of resources appropriate to whatever task(s) performed by the network 102.

In FIG. 4e, another application of decoupled routing becomes evident which is the ability to adapt autonomously to a changing network topology. Here, node B 110 is shaded to indicate that it is not performing at a performance expected by node A 104 as required for preferred node for node A 104. Node B 110 may be out of service or have been removed entirely from the network. Node A 104 may send a service request to node B 110, but node B 110 does not respond with a response in the expected time or in some other way does not respond sufficiently to the request by node A 104. Node A 104 can then decide to update its own routing Table III in the database 160 and remove node B 110 from its list of preferred nodes or suppliers. Node A 104 may schedule a retry of node B 110 in the future.

Node A 104 may decide at a later date to retry node B 110. The triggers for an originating node, such as node A 104, updating its topological view of the network may vary. The updating provides an opportunity for node A104 to update the Tables I and Table III available nodes to service requests and their respective properties and Table II types of task(s) and associated criteria to be sent to other nodes to be serviced in the database 160.

Figure 4F:
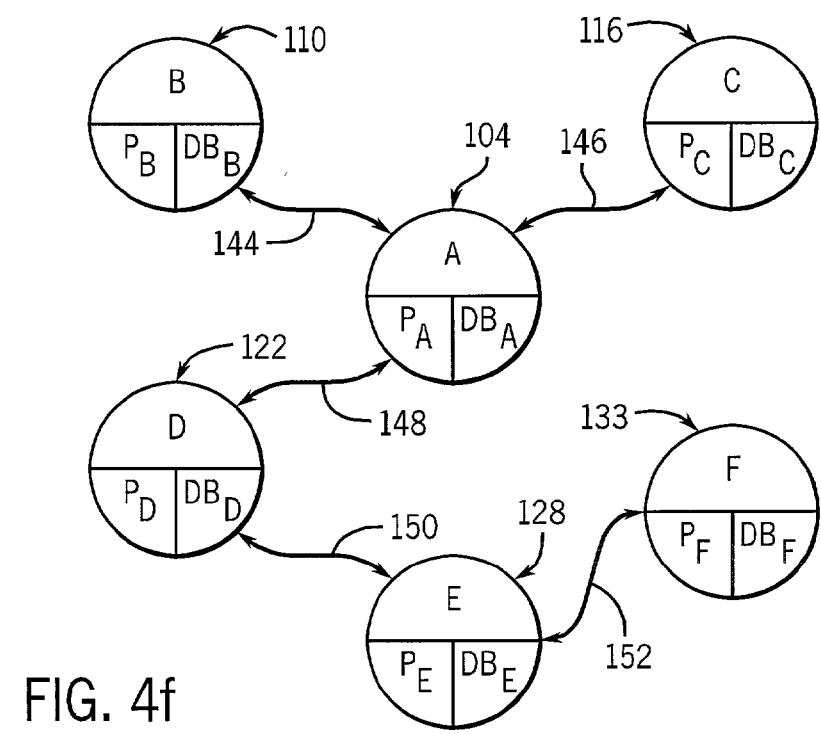

In FIG. 4f, a new node, node F 133, is added to the network. In the prior examples, this node would be discovered by any service request messages sent from any other node in the network. In the case of service requests originating from nodes that are more than one network hop away, an originating node would not have direct knowledge of the new node because no hardware or any other mechanisms would have been installed. Thus, a broadcast messages from node A 104 would not reach node F133. For nodes that are adjacent to or one hop away from the new node F 133, node F 133 would respond to requests. The adjacent nodes would then, similarly to the described examples involving Node A 104, update their own "view of the network" as expressed by their own versions of Table I of FIG. 2. For nodes that are farther away than a single hop, the introduction of node F 133 into the network would require either that an originating node and intermediate nodes allow multiple hops in their service request messages, or that the new node, node F 133, send out notification in the form of broadcast, say, "table update request", messages, or both. In accordance with an example of the invention, multiple hops are not required because in de-coupled routing a node's "vision" of the rest of the network is just its immediate interfaced nodes. A node two hops removed may appear logically as just one more node, and the interface to that node may be the same physical interface as the physically adjacent node, even though a message to that node appears to be sent directly to it and responses from it directly back from it. In other words, what's beyond the set of nodes that the first node "knows" about is irrelevant as long as the task(s) that are sent out to nodes in the Table III are performed by some node.

In addition to triggers such as those caused by a new hardware installation, other events such as operational failures, scheduled "refresh" operations, etc., may be used. A threshold could be set in any node to periodically send out broadcast update requests—to any "depth" (number of message hops) desired. In this example, the hops are irrelevant as well. A broadcast goes out initially, and any node that responds from anywhere can choose to send a bid directly to the originator allowing the originating node to know about the existence of that new or distant node). Alternatively, the responding node may choose to respond only to the node that it actually received the immediate request from or any intermediate node. In this example, the first node gets the task done, either by itself or by sending it on to other nodes is irrelevant to the originating node.

Additional examples of thresholds may be established for when a time limit was reached, or when any number of events had occurred. One example of an exceeded threshold that would cause a "refresh" request to be broadcast would be a perceived trend in service quality. In cases where the quality of service was declining, a message would allow all nodes in the network to re-optimize their data views of the network "routing tables" such as Table I of FIG. 2, etc. In cases where the service quality was actually increasing, the network might respond by re-allocating or simply removing from service some nodes or resources in order to optimize the efficiency with which the network nodes or other resources were being used.

Thus, the decoupled routing system can modify itself to accommodate any number of external changes and minimize manual intervention in the maintenance and growth of the networks with improved efficiency in response to stimuli and conditions that are not readily perceived or understood by humans.

Figure 5:
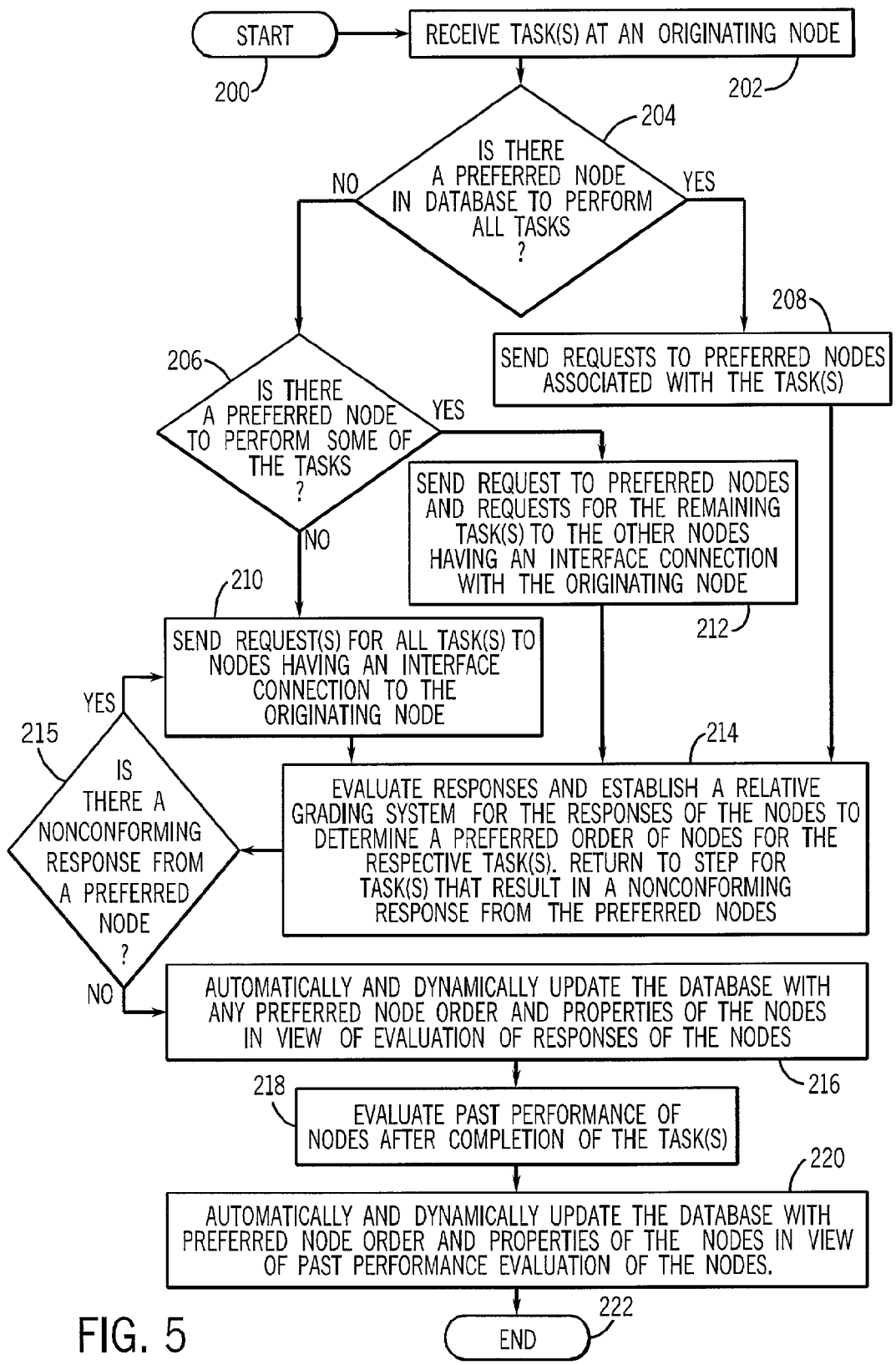
FIG. 5 is a flow diagram describing examples of an operation of a de-coupled routing network in accordance with the invention.

FIG. 5 shows an example method of the operation of the routing network 102 in the system 100.

The method begins at start 200. In step 202, a task is received at an originating node. As an example, the task is entered by a human operator at terminal 136 and is received by node A 104. The criteria for the task is generated by node A 104 and entered as a task type in Table II in database 160. At step 204, it is determined if there are preferred nodes in the database 60 for node A 104 to perform all of the task(s). If yes, the method proceeds to step 208, and requests are sent to the preferred nodes associated with the task(s). If not, the method proceeds to step 206 where it is determined if there are preferred nodes to perform some of the task(s). If yes, then at step 212 requests are set to the preferred nodes and requests for the remaining task(s) are sent to the other nodes in the network having an interface connection with the originating node. If not, then at step 210 requests for all task(s) are sent to all nodes having an interface connection with the originating node. Step 210 is the broadcast request, which is also used when the originating node decides that it needs to input new data in the database 160 in Table I, listing node properties, and/or Table III, listing preferred nodes.

In step 214, the responses are evaluated and a relative grading system is established to determine the preferred order of nodes for the respective task(s). Then in step 215 it is determined whether any of the requests result in any nonconforming responses from preferred nodes. If not, the method proceeds to step 216 and if yes the method returns to step 210 to send a request for task(s) associated with the nonconforming responses of the preferred nodes.

The method at step 216 automatically and dynamically updates the database with any preferred node order and properties of the nodes in view of the evaluation of responses of the nodes.

Next in step 218, a post performance evaluation of the nodes is made after the completion of the task(s) by the nodes. Then the database 160 is automatically and dynamically updated with any preferred node order and properties of the nodes in view of the post performance evaluation of the nodes. The method then ends at step 222.

The steps and operations described herein are just exemplary. There may be many variations to these steps or operations without departing from the spirit of the invention. For instance, the steps may be performed in a differing order, or steps may be added, deleted, or modified. While the criteria for determining the relative performance and availability of nodes may be varied by the task(s) themselves, the basic algorithm of dynamically modifying the arrangement and performance of the network remains the same. This allows the network to dynamically repair itself and optimize its performance without manual intervention to a finer resolution and taking more conditions into account than a routing network that does not function in a decoupled manner.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method in a routing network, comprising the steps of:
    sending a request for a performance of a task from an originating node to one or more nodes having an interface connection with the originating node;
    upon receiving a response to the request that conforms to the performance of the task from the one or more nodes, selecting one or more of the nodes to perform the task;
    wherein any node included in the network comprises the originating node; and
    wherein the steps of sending and selecting are performed automatically;
    the method further comprising the step of:
        establishing, by the originating node, a standard for the task that corresponds to a criteria of the task provided by a source of the task;
        wherein the standard for acceptance of the task is dependent on a) an expected speed of performance of the response, b) a distance of the one or more nodes from the originating node, and c) a quality of performance for a previous task; and
        wherein a preferential order of the one or more nodes is dynamically generated based on the standard, and wherein the originating node changes the standard for the preferential order of the one or more nodes upon a review of the performance of the one or more nodes and a determination of which of the one or more nodes are no longer available in the network, and wherein underperforming nodes are assigned a less preferential position in the preferential order.

2. The method of claim 1, wherein the step of sending comprises the step of selecting, by the originating node, the one or more nodes from a list of preferential nodes associated with the task.

3. The method of claim 1, wherein the step of sending comprises the step of selecting, by the originating node, the one or more nodes from a list of nodes with associated properties.

4. The method of claim 1, wherein the at least one or more nodes have a preselected subtended distance from the originating node.

5. The method of claim 1, further comprising the steps of:
    comparing the responses of the one or more nodes with the standard determined by the originating node;
    storing in a database in the preferential order the identity of the one or more nodes and a correlation of the responses of the one or more nodes to the standard; and
    automatically and dynamically modifying the database in dependence on the responses of the one or more nodes.

6. The method of claim 5, wherein the step of modifying comprises the step of assigning the preferential order of nodes associated with a task in dependence on the performance of the one or more nodes.

7. The method of claim 3, wherein a response of the one or more nodes comprises the step of not responding to the request.

8. The method of claim 3, wherein a response of the, one or more nodes comprises the step of communicating a substantive response to the request to the originating node.

9. The method of claim 1, further comprising the steps of:
    delivering, via the one or more of the nodes having the interface connection with the originating node, the request of the originating node to one or more nodes not having an interface with the originating node; and
    communicating directly or through the one or more of the nodes having the interface connection with the originating node a response to the originating node from the one or more of the nodes not having an interface with the originating node.

10. The method of claim 1, further comprising the step of:
    accepting by the originating node of one or more of the responses of the one or more nodes that satisfy the standard; and
    wherein the standard for acceptance of a response is dependent upon an estimated time duration of performance of the response.

11. The method of claim 1, further comprising the step of accepting by the originating node of the response of the one or more nodes that satisfy the standard; and
    wherein the standard for acceptance of a response is dependent upon a relative comparison of the response of the one or more of the nodes.

12. The method of claim 1, further comprising the step of accepting by the originating node of the response of the one or more nodes that satisfy the standard; and
    wherein the standard for acceptance of a response is dependent upon completeness of the response to the request.

13. The method of claim 1, further comprising the step of accepting by the originating node the response of the one or more nodes that satisfy the standard.

14. The method of claim 1, further comprising the steps of:
    determining a performance topology of the routing network;
    periodically collecting information about the performance of the one or more nodes; and
    assigning a value to each of the one or more nodes in dependence upon the performance of the one or more nodes.

15. A system in a routing network, comprising:
    a processor for automatically sending a request for a performance of a task from an originating node to one or more nodes having an interface connection with the originating node;
    wherein upon receiving a response that conforms to the performance of the task automatically selecting the one or more nodes to perform the task; and
    wherein a standard for acceptance of the task is dependent on a) an expected speed of performance of the response, b) a distance of the one or more nodes from the originating node, and c) a quality of performance for a previous task; and
    wherein a preferential list of the one or more nodes is dynamically generated based on the standard, and wherein the originating node changes the standard for the preferential order of the one or more nodes upon a review of the performance of the one or more nodes and a determination of which of the one or more nodes are no longer available in the network, and wherein underperforming nodes are assigned a less preferential position in the preferential order.

16. The system of claim 15, further comprising a database associated with the originating node that includes the preferential list of nodes associated with the task; and
wherein the preferential list of nodes is automatically and dynamically updated upon an evaluation by the processor of the response of the one or more nodes.

17. The system of claim 16, wherein the evaluation by the processor determines the conformance of the response with the standard established by the processor.

18. The system of claim 17, wherein the standard is associated with the criteria of the task established by the source of the task.

19. The system of claim 15, wherein the at least one or more nodes have a preselected subtended distance from the originating node.

20. The method of claim 1, wherein the one or more nodes that performs the task are sole arbiters of how the task will be performed.

21. The method of claim 1, wherein said any node included in the network comprises the originating node whenever said any node is added to the network, receives tasks, or forwards tasks to other nodes to be serviced.

22. The method of claim 1, wherein, initially after being installed in the network, the originating node is aware of interface connections to nodes within one hop.

23. The method of claim 1, wherein one property of the one or more nodes with the interface connection comprises an ability to perform specific calculations.

24. The method of claim 1, wherein one property of the one or more nodes with the interface connection comprises forwarding of data packets.

25. The method of claim 1, wherein the request for the performance of the task is sent, without a specified address, from the originating node to the one or more nodes having the interface connection with the originating node.

26. The method of claim 1, further comprising the step of automatically and dynamically updating an originating node database with any preferred node order and properties of the one or more nodes based on the review of the performance of the one or more nodes.

27. The method of claim 1, wherein the originating node places an identity of a connected node and its properties in an originating node database when the originating node has no task.

28. The method of claim 1, wherein the originating node is a gateway.

29. The method of claim 1, wherein a function of the originating node changes automatically.

30. The method of claim 1, wherein a function of the originating node changes dynamically.

31. The method of claim 1, wherein undependable nodes are removed from the preferential order.

32. method of claim 1, wherein the source of the task is a computer terminal.

* * * * *

UNITED STATES PATENT AND TRADEMARK OFFICE
CERTIFICATE OF CORRECTION

PATENT NO. : 7,668,899 B2 Page 1 of 1
APPLICATION NO. : 10/140150
DATED : February 23, 2010
INVENTOR(S) : Gilbert Mark Stewart It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this

Twenty-eighth Day of December, 2010

David J. Kappos
*Director of the United States Patent and Trademark Office*